United States Patent
Kudo et al.

(10) Patent No.: US 8,165,036 B2
(45) Date of Patent: Apr. 24, 2012

(54) NETWORK DEVICE, INFORMATION PROCESSING DEVICE, AND COMPUTER READABLE STORAGE MEDIUM THEREFOR

(75) Inventors: Yasuhiro Kudo, Aichi (JP); Masafumi Miyazawa, Aichi (JP)

(73) Assignee: Brother Kogyo Kabushiki Kaisha (JP)

( * ) Notice: Subject to any disclaimer, the term of this patent is extended or adjusted under 35 U.S.C. 154(b) by 430 days.

(21) Appl. No.: 11/755,280

(22) Filed: May 30, 2007

(65) Prior Publication Data
US 2007/0283152 A1 Dec. 6, 2007

(30) Foreign Application Priority Data

May 31, 2006 (JP) ................................. 2006-152298

(51) Int. Cl.
*H04L 12/28* (2006.01)
*G06F 7/04* (2006.01)
(52) U.S. Cl. .................... 370/254; 726/4; 713/171
(58) Field of Classification Search .................. None
See application file for complete search history.

(56) References Cited

U.S. PATENT DOCUMENTS

| | | | | |
|---|---|---|---|---|
| 4,531,023 | A * | 7/1985 | Levine | 726/13 |
| 5,235,642 | A * | 8/1993 | Wobber et al. | 713/156 |
| 6,212,633 | B1 * | 4/2001 | Levy et al. | 709/228 |
| 7,051,102 | B2 | 5/2006 | Gupta et al. | |
| 7,093,046 | B2 | 8/2006 | Keeney et al. | 710/220 |
| 7,324,233 | B2 * | 1/2008 | Shima et al. | 358/1.15 |
| 7,458,095 | B2 * | 11/2008 | Forsberg | 726/3 |
| 7,542,573 | B2 * | 6/2009 | Ogawa et al. | 380/279 |
| 2001/0037358 | A1 * | 11/2001 | Clubb et al. | 709/203 |
| 2003/0002077 | A1 * | 1/2003 | Shima | 358/1.15 |
| 2003/0037252 | A1 * | 2/2003 | Abrams | 713/200 |
| 2003/0149875 | A1 * | 8/2003 | Hosaka | 713/168 |

(Continued)

FOREIGN PATENT DOCUMENTS

| | | |
|---|---|---|
| EP | 1289187 | 3/2003 |
| JP | 2003-256392 A | 9/2003 |
| JP | 2004-30062 A | 1/2004 |
| JP | 2004-30610 A | 1/2004 |
| JP | 2004048649 | 2/2004 |
| JP | 2005-86416 A | 3/2005 |

OTHER PUBLICATIONS

JP Office Action dtd May 27, 2008, JP Appln. 2006-152298.

(Continued)

*Primary Examiner* — Chirag Shah
*Assistant Examiner* — Joshua Smith
(74) *Attorney, Agent, or Firm* — Banner & Witcoff, Ltd.

(57) ABSTRACT

A network device is provided. The network device includes a communicating unit, configured to communicate with an information processing device via a network to make an operational setting for encrypted communication to be established between the network device and the information processing device, a searching packet receiving unit to receive a searching packet to search for network devices transmitted from the information processing device, a judging unit to judge the status of the operational setting for the encrypted communication, a reply packet generating unit to generate a reply packet including information regarding the result of the judgment made by the judging unit in response to the searching packet which is received by the searching packet receiving unit, and a reply packet transmitting unit to transmit the reply packet generated by the reply packet generating unit to the information processing device via the network.

20 Claims, 11 Drawing Sheets

U.S. PATENT DOCUMENTS

| | | | |
|---|---|---|---|
| 2004/0054962 A1* | 3/2004 | Shima et al. | 715/500 |
| 2004/0117615 A1* | 6/2004 | O'Donnell et al. | 713/155 |
| 2004/0128551 A1* | 7/2004 | Walker et al. | 713/201 |
| 2004/0187022 A1* | 9/2004 | Asada et al. | 713/200 |
| 2004/0228357 A1* | 11/2004 | Ogawa et al. | 370/401 |
| 2005/0052694 A1* | 3/2005 | Asano | 358/1.15 |
| 2005/0063002 A1 | 3/2005 | Sugahara | |
| 2005/0086332 A1 | 4/2005 | Nakazawa | |
| 2005/0220054 A1* | 10/2005 | Meier et al. | 370/331 |
| 2005/0223228 A1* | 10/2005 | Ogawa et al. | 713/168 |
| 2005/0278534 A1* | 12/2005 | Nadalin et al. | 713/175 |
| 2006/0064580 A1* | 3/2006 | Euchner et al. | 713/156 |
| 2006/0123224 A1* | 6/2006 | Klug et al. | 713/150 |
| 2006/0170953 A1* | 8/2006 | Okamoto et al. | 358/1.15 |
| 2006/0174116 A1* | 8/2006 | Balfanz et al. | 713/168 |
| 2006/0288227 A1* | 12/2006 | Kalofonos et al. | 713/182 |

OTHER PUBLICATIONS

European Patent Office Search Report for Application No. 07010512.7-2413, dated Oct. 19, 2007.

European Office Action issued in EP Appln No. 07010512.7, dated Sep. 21, 2011.

* cited by examiner

```
Version: 1
Community: public
PDU type: 0   ← INDICATES DATA TYPE IS GET TYPE
Request id 0x00000001
Error Status: 0
Error Index: 0
Object identifier. 1.3.6.1.2.1.1.5.0   ← OID OF SYSTEM NAME
Value: NULL
Object identifier. 1.3.6.1.2.1.25.3.5.1.1.1   ← OID OF OPERATIONAL STATUS
Value: NULL
```

Prior Art
FIG.4A

```
Version: 1
Community: public
PDU type: 0   ← INDICATES DATA TYPE IS GET TYPE
Request id 0x00000001
Error Status: 0
Error Index: 0
Object identifier. 1.3.6.1.2.1.1.5.0   ← OID OF SYSTEM NAME
Value: NULL
Object identifier. 1.3.6.1.4.1.2435.*.1.0   ← OID OF ENCRYPTED COMMUNICATION FUNCTION
Value: NULL
Object identifier. 1.3.6.1.4.1.2435.*.2.0   ← OID OF OPERATIONAL SETTING FOR ENCRYPTED
                                              COMMUNICATION FUNCTION
Value: NULL
```

FIG.4B

```
Version: 1
Community: public
PDU type: 0    ← INDICATES DATA TYPE IS RESPONSE TYPE
Request Id 0x00000001
Error Status: 0    ← STATUS IS NOT ERROR
Error Index: 0
Object identifier. 1.3.6.1.2.1.1.5.0
Value: "Printer-21"    ← SYSTEM NAME
Object identifier. 1.3.6.1.4.1.2435.*.1.0
Value: 1         ← ENCRYPTED COMMUNICATION FUNCTION PROVIDED
Object identifier. 1.3.6.1.4.1.2435.*.2.0
Value: 1         ← OPERATIONAL SETTING FOR ENCRYPTED COMMUNICATION HAS BEEN MADE
```

FIG.5A

```
Version: 1
Community: public
PDU type: 2    ← INDICATES DATA TYPE IS RESPONSE TYPE
Request Id 0x00000001
Error Status: 0    ← STATUS IS NOT ERROR
Error Index: 0
Object identifier. 1.3.6.1.2.1.1.5.0
Value: "Printer-21"    ← SYSTEM NAME
Object identifier. 1.3.6.1.4.1.2435.*.1.0
Value: 1         ← ENCRYPTED COMMUNICATION FUNCTION PROVIDED
Object identifier. 1.3.6.1.4.1.2435.*.2.0
Value: 0         ← OPERATIONAL SETTING FOR ENCRYPTED COMMUNICATION HAS NOT BEEN MADE
```

FIG.5B

Version: 1
Community: public
PDU type: 2  ← INDICATES DATA TYPE IS RESPONSE TYPE
Request Id 0x00000001
Error Status: 0  ← STATUS IS NOT ERROR
Error Index: 0
Object identifier. 1.3.6.1.2.1.1.5.0
Value: "Printer-01"  ← SYSTEM NAME
Object identifier. 1.3.6.1.2.1.25.3.5.1.1.1
Value: 3          ← OPERATIONAL STATUS (IDLE STATE)

FIG.6A

Version: 1
Community: public
PDU type: 2  ← INDICATES DATA TYPE IS RESPONSE TYPE
Request Id 0x00000001
Error Status: 2  ← NO SUCH NAME: REQUIRED OBJECT DOES NOT EXIST
Error Index: 1
Object identifier. 1.3.6.1.2.1.1.5.0
Value: NULL
Object identifier. 1.3.6.1.2.1.25.3.5.1.1.1
Value: NULL

FIG.6B

NETWORK DEVICE, INFORMATION PROCESSING DEVICE, AND COMPUTER READABLE STORAGE MEDIUM THEREFOR

CROSS REFERENCE TO RELATED APPLICATION

This application claims priority from Japanese Patent Application NO.2006-152298, filed on May 31, 2006, the entire subject matter of which is incorporated herein by reference.

BACKGROUND

1. Technical Field

Aspects of the present invention relates to a technology for network being connected with network devices having an encrypted communication function.

2. Related Art

Generally, as data is transferred in plaintext via a network, a content of the data may be viewed by malicious users. Therefore, recently, such unauthorized viewing by malicious users can be prevented by using a device capable of encrypted communication so that data with high secrecy can be securely transferred within the network.

Conventionally, a method to create and display a list of network devices provided in a network, whereby a determination can be made as to whether a network addresses is assigned each of the devices, has been developed, In the method, the network devices connected to the network are retrieved in accordance with a specific network protocol wherein network devices having network addresses assigned and network devices without network addresses are uniformly communicable. Further, the network devices with the network addresses assigned are selectively retrieved by using data to be replied solely by the network devices having the network addresses assigned. Thereafter, a list of devices indicating as to whether the network addresses are assigned to the network devices is displayed based on the result of the retrieval. Such a method is disclosed in Japanese Patent Provisional Publication NO. 2004-048649.

However, in the conventional method, while devices in the network require to be made various operational setting for the encrypted communication, there have not been provided users with ways to know as to whether the operational setting had been made for each network device in the network collectively. Therefore, as a number of network devices grows it has been difficult for the users to identify for which network device the operational setting for the encrypted communication should be made.

SUMMARY

The present invention is advantageous in that a user can easily and accurately recognize status of operational setting for encrypted communication for each network device being connected to the network in a prompt manner.

BRIEF DESCRIPTION OF THE ACCOMPANYING DRAWINGS

FIGS. 4A and 4B are schematic diagrams showing configurations of searching packets according to the embodiment of the present invention.

FIGS. 5A and 5B are schematic diagrams showing configurations of reply packets corresponding to an encrypted communication enabled searching packet according to the embodiment of the present invention.

FIGS. 6A and 6B are schematic diagrams showing configurations of reply packets corresponding to a normal searching packet according to the embodiment of the present invention.

DETAILED DESCRIPTION

General Overview

Figure 1:
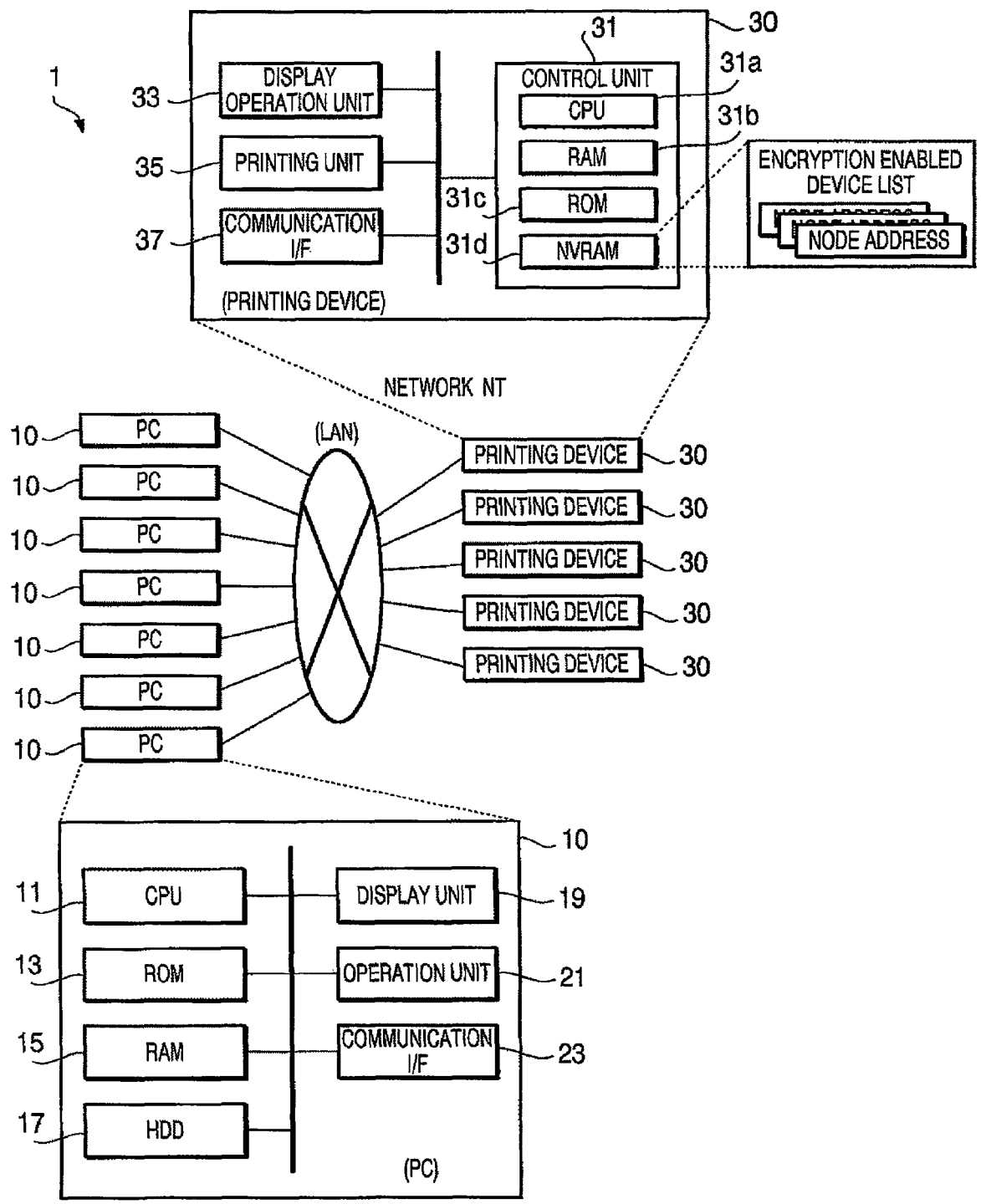
FIG. 1 is a block diagram showing a configuration of a communication system 1 according to an embodiment of the present invention.

According to an aspect of the present invention, there is provided a network device comprising a communicating unit, which is adapted to communicate with an information processing device via a network to make an operational setting for encrypted communication to be established between the network device and the information processing device, a searching packet receiving unit, which is adapted to receive a searching packet to search for network devices transmitted from the information processing device via the network, a judging unit, which is adapted to judge status of the operational setting for the encrypted communication between the network device and the information processing device, a reply packet generating unit, which is adapted to generate a reply packet including information regarding the result of the judgment made by the judging unit in response to the searching packet which is received by the searching packet receiving unit; and a reply packet transmitting unit, which is adapted to transmit the reply packet generated by the reply packet generating unit to the information processing device via the network.

With the above configuration, in the network device according to the present invention, information indicating the status of the operational setting of the network device for the encrypted communication is included in the reply packet to be transmitted (returned) to the information processing device in response to the searching packet. Therefore, in the network having the above network device, the information processing device as a user terminal capable of searching the network devices can recognize the status of the operational setting for the encrypted communication of the replied network device by a simple operation such as transmitting the searching packet and receiving the reply packet. Consequently, the information processing device which transmits the searching packet can display a device list indicating the status of the operational setting for the encrypted communication, which allows a user to recognize the status of the operational setting for the encrypted communication easily.

Further, in the network configured as above having the above network device, since the network device returns the status of the operational setting for the encrypted communication in response to the searching packet is transmitted from the information processing device, the information processing device is required to transmit the searching packet merely once, and the network device is required to reply to the information processing device merely once for the searching packet received. Accordingly, network resources can be prevented from being occupied and effectively utilized, so that an error in a searching result that may be caused by turning a power source of the network device ON or OFF during the search can be prevented. Consequently, correct status of the operational setting for the encrypted communication can be recognized on a network device basis.

It should be noted that the network device according to the present invention may be configured to communicate with a plurality of information processing devices provided in the network. The network device configured as above may have a common operational setting for the plurality of information processing devices or may have a different operational setting for each of the information processing devices.

Optionally, the network device may be configured to make the operational setting for the encrypted communication on an information processing device basis. The judging unit may judge the status of the operational setting for the encrypted communication to be established between the information processing device as a sender of the searching packet and the network device on a received searching packet basis. The reply packet generating unit may generate the reply packet including information regarding the result of the judgment made by the judging unit regarding the status of the operational setting to be established between the information processing device as the sender of the searching packet and the network device.

In the network device configured as above, the information regarding the status of the operational setting between the information processing device as the sender of the searching packet and the network device is individually transmitted to the information processing device. Thus, the information processing device as the sender of the searching packet is capable of recognizing the status of the operational setting for the encrypted communication between the information processing device itself and the network device promptly, correctly and easily.

Specifically, it should be noted that, when the network device transmits the reply packet including the information regarding the status of the operational setting for the encrypted communication between each information processing device and the network device for all information processing devices at a time, the information processing device is required to extract the information related to the information processing device itself only from the reply packet including the information regarding the status of the operational settings between the other information processing device and the network devices. However, in the present invention, the network device is adapted to generate the reply packet including information only for the information processing device as the sender of the searching packet so that the information processing device is not required to extract the information as above.

The network device may be configured to transmit the reply packet including the information regarding the result of judgment made by the judging unit for every searching packet. However, it is more preferable to configure the network device to transmit the reply packet including the information regarding the result of judgment made by the judging unit only when the network device receives a specific searching packet including a description to query the status of the operational setting for encrypted communication.

Optionally, the network device may further comprise a packet judging unit, which is adapted to judge as to whether the received searching packet is a specific searching packet including a description to query the status of the operational setting for encrypted communication. The reply packet generating unit may generate the reply packet including the information regarding the result of the judgment made by the judging unit when the packet judging unit judges that the received searching packet is the specific searching packet.

In the network device configured as above, the information regarding the result of judgment made by the judging unit is included in the reply packet only when the explicit query regarding the status of the operational setting for encrypted communication is made. Therefore, when the searching packet is transmitted only for searching network devices, unnecessary information is not included in the reply packet so that network resources can be effectively utilized.

With the information processing device being configured to make the explicit query when the information regarding the status of an operational setting for the encrypted communication is necessary, and if no explicit query is made, the network device may be configured to switch a method to reply to the searching packet depending on the status of the operational setting for the encrypted communication.

In the information processing device, which is operated on an operating system such as Windows (registered trademark), when a screen for selecting a network device to be used (such as a selection screen for a printer to be used when the network device is a printing device) is displayed to a user, the searching packet is transmitted to the network, and a list of network devices which returned acknowledgments is displayed on the screen for selecting. With this technique, a negative acknowledgment (an error packet) can be transmitted from the network device to the information processing device when the operational setting for the encrypted communication has not been made so that the network device whose operational setting has not been made should not be listed on the list to be displayed on the screen for selecting, and use of the network device in unfavorable condition by the user can be prevented. Further, displaying the list with the unavailable network devices on the screen for selecting can be avoided.

Optionally, the reply packet generating unit may generate an error packet as the reply packet when the packet judging unit judges that the received searching packet is not the specific searching packet, and when the judging unit judges that the operational setting for the encrypted communication has not been made.

In the network device configured as above, the information regarding the status of the operational setting for the encrypted communication is transmitted to the information processing device by using the searching packet so that the network device whose operational setting has not been made is not included in a list of the devices displayed on the screen for selecting a network device selection.

Optionally, the network device may further comprise a reply control unit, which is adapted to refrain from responding to the received searching packet when the packet judging unit judges that the received searching packet is not the specific searching packet, and when the judging unit judges that the operational setting for encrypted communication has not been made.

Optionally, the reply control unit may discard the received searching packet and prevent the reply packet from being generated when the packet judging unit judges that the received searching packet is not the specific searching packet, and when the judging unit judges that the operational setting for encrypted communication has not been made.

Also with the above configuration, the network device whose operational setting has not been made is not included in a list of the devices displayed on the screen for selecting a network device selection.

According to another aspect of the invention, an information processing device capable of communicating with a network device via a network is provided. The information processing device comprises a searching unit, which is adapted to transmit a searching packet to search for network devices in the network, a reply packet receiving unit, which is adapted to receive a reply packet transmitted from the network device via the network, the reply packet being transmitted from the network device in response to the searching packet and including status information regarding status of an operational setting for encrypted communication to be established between the information processing device and the network device, a sender status judging unit, which is adapted to judge the status of the operational setting for the encrypted communication in the network device as a sender of the reply packet, based on the status information included in the reply packet transmitted from the network device and received by the reply packet receiving unit, and a list display unit, which is adapted to display a list of devices provided in the network, wherein the status of the operational settings of the network devices can be identified, on a display device based on the result of the judgment made by the sender status judging unit.

Optionally, the network devices whose operational settings have not been made and the network devices whose operational settings have been made may be explicitly distinguished on a network device basis in the list of devices.

According to the information processing device configured as above, a list wherein the network devices whose operational setting has not been made and a list wherein the network devices whose operational setting has been made are identifiably displayed, therefore, the user can recognize the status of the operational setting for the encrypted communication of the network device being connected to the network easily.

Optionally, the list display unit may display a first list wherein the network devices whose operational settings have not been made are listed and a second list wherein the network devices whose operational settings have been made are listed separately on the display device based on the result of the judgment made by the sender status judging unit.

In the information processing device configured as above, the status of the operational setting of the network device is shown to the user simply so that the user can recognize at one view as to whether the operational setting for the encrypted communication of the network devices has been made easily.

Optionally, the information processing device may further comprise an operational setting making unit, which is adapted to communicate with a network device selected by a user among the network devices being listed in the list of devices displayed by the list display unit via the network and make the operational setting for the encrypted communication to be established between the network device and the information processing device.

In the information processing device as above, setting operations for making the operational setting for the encrypted communication can be made easily in a simple process after the setting status is recognized by the user.

According to another aspect of the invention, there is provided a computer readable storage medium comprising computer readable instructions for controlling a computer. The computer is capable of communicating with a network device via a network, to make the operational setting for the encrypted communication by executing steps of transmitting a searching packet, which is to search for network devices, in the network, receiving a reply packet transmitted from the network device via the network, the reply packet being transmitted from the network device in response to the searching packet and including status information regarding status of an operational setting for encrypted communication to be established between the computer and the network device, judging the status of the operational setting for the encrypted communication in the network device as a sender of the reply packet, based on the status information included in the reply packet transmitted from the network device and received by the reply packet receiving unit, and displaying a list of devices provided in the network, wherein the status of the operational settings of the network devices can be distinguished, on a display device based on the result of the judgment made by the sender status judging unit.

Optionally, the network devices whose operational settings have not been made and the network devices whose operational settings have been made may be explicitly distinguished on a network device basis in the list of devices displayed in the displaying step.

According to the computer readable storage medium having the computer readable instructions, the information processing device as described above can be configured, and a device list regarding the status of the operational setting for the encrypted communication of the network device as described above can be displayed promptly and correctly.

Embodiments

Hereinafter, referring to the accompanying drawings, an embodiment of the present invention will be described. FIG. 1 is a block diagram showing a configuration of a communication system I according to an embodiment of the present invention. As shown in FIG. 1, the communication system I according to the present embodiment includes a plurality of personal computers (hereinafter referred to as "PC") 10 and a plurality of printing devices 30 which are communicably connected to each other via a network (LAN) NT.

Each of the PCs 10 configuring the communication system 1 includes a CPU 11 to execute various programs, a RAM 13 to be used as a working area for the programs, a ROM 15 wherein a boot program is stored, a hard disc drive 17 wherein application programs and other data are stored, a display unit 19 with for example a liquid crystal display, an operation unit 21 with a keyboard and a pointing device, and a communication interface 23 being connected to the network NT and capable of communicating with the other devices on the network NT.

The PC 10 is managed by a known operating system (for example, Windows (registered trademark)) and executes various programs by the CPU 11 in accordance with operations from a user though the operation unit 21. For example, the PC 10 is capable of searching for the printing devices 30 on the network NT in accordance with SNMP (Simple Network Management Protocol), transmitting printing data designated by the user to one of the printing devices 30 based on a result of the search in accordance with a TCP/IP protocol, and having the printing device 30 to print an image corresponding to the printing data designated by the user on recording sheets.

The printing device 30, on the other hand, includes a control unit 31 to control the other units in the printing device 30 itself, a display operation unit 33 having various operation keys and liquid crystal display, and the like, a printing unit 35 to print an image corresponding to printing data, and a communication interface 37 connected to the network NT and capable of communicating with the other devices on the network NT.

The control unit 31 of the printing device 30 includes a CPU 31a to execute various programs, a RAM 31b to be used as a working area for the programs, a ROM 31c wherein programs to be executed by the CPU 31a are stored and an NVRAM 31d as an electrically rewritable nonvolatile memory wherein setting information is stored. The control unit 31 executes the various programs stored in the CPU 31a to implement encrypted communication, network printing, and other usable functions. For example, the control unit 31 receives the printing data designated by the user from the PC 10 via the network NT in the encrypted communication and controls the printing unit 35 so that an image corresponding to the printing data is formed on the recording sheets.

Figure 2:
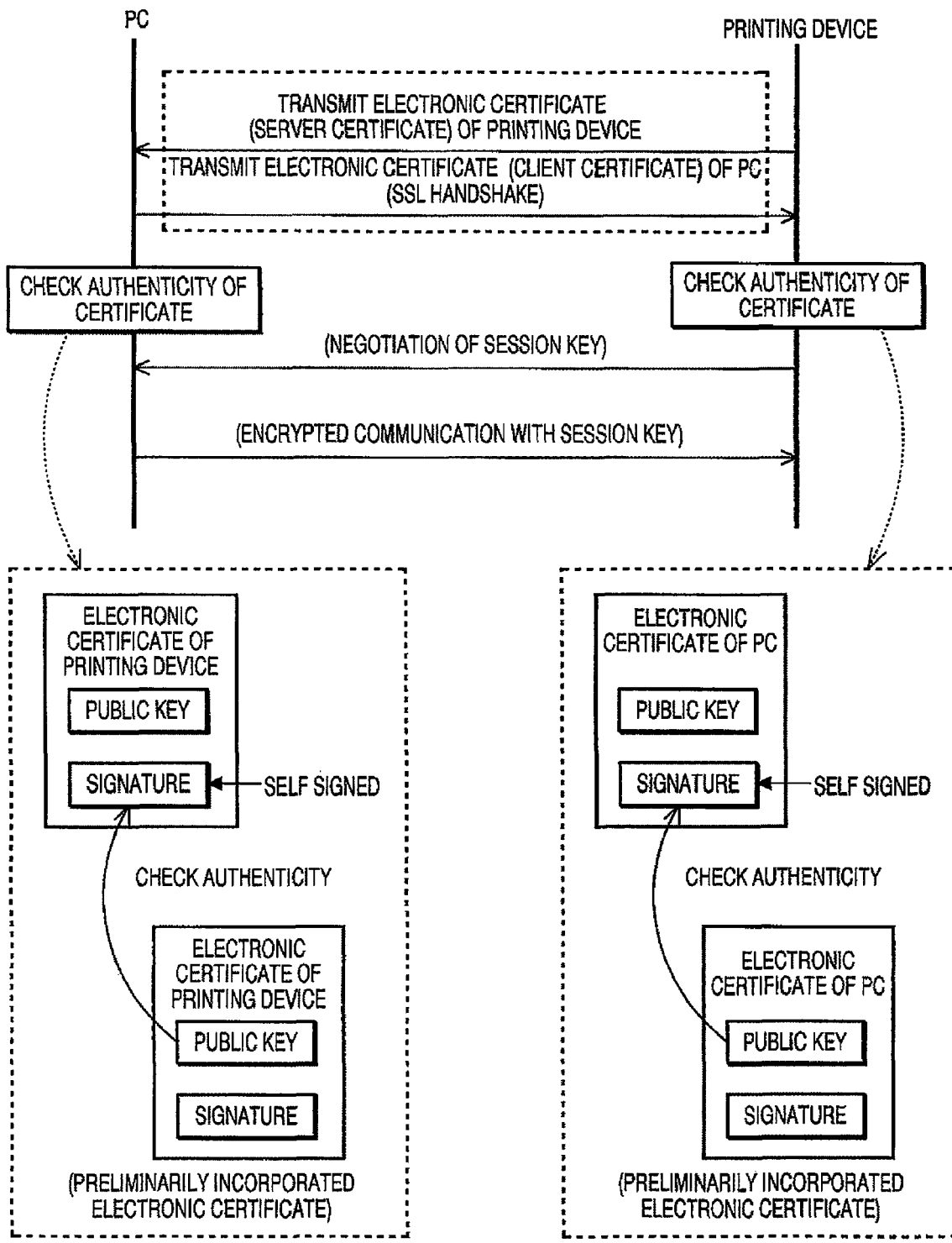
FIG. 2 is a schematic diagram showing procedures taken in encrypted communication between a PC 10 and a printing device 30 according to the embodiment of the present invention.

FIG. 2 is a schematic diagram showing procedures taken in encrypted communication between the PC 10 and the printing device 30 according to the embodiment of the present invention. In the communication system 1 in the present embodiment, an SSL (Secure Socket Layer) handshake is executed between the PC 10 and the printing device 30 when communication between the PC 10 and the printing device 30 is established.

Specifically, each of the printing device 30 and the PC 10 in the present embodiment has an SSL communication function, a function to generate a private key and a public key, and a function to issue an electronic certificate indicating the public key. Thus, each of the printing device 30 and the PC 10 has a function to issue a self-signed electronic certificate. With this function, the printing device 30 and the PC 10 respectively create a digital signature by encrypting a hash value, which is generated from information to be transmitted (a public key, for example), by using its private key and include the created digital signature in the electronic certificate as a self-signed electronic certificate indicating its own public key.

When the SSL handshake is established, the printing device 30 transmits its electronic certificate (a so-called server certificate) which was previously issued in the above process to the PC 10, and the PC 10 transmits its electronic certificate (a so-called client certificate) to the printing device 30.

As the client certificate is received by the printing device 30, the printing device 30 judges as to whether the received client certificate is an authorized electronic certificate in accordance with the electronic certificate previously provided from the PC 10. Specifically, the digital signature included in the currently received client certificate is decrypted by using the public key included in the previously provided electronic certificate, and it is examined as to whether the hash value of the digital signature included in the currently received electronic certificate matches the hash value of the other information transmitted with the digital signature in order to judge as to whether the currently received electronic certificate is an authorized electronic certificate without any falsifications Similarly, the PC 10 judges as to whether the currently received server certificate is an authorized certificate in accordance with the electronics certificate previously provided from printing device 30 to the PC 10. When the server certificate and the client certificate are judged to be authorized certificates and confirmed that no spoofing by malicious person has occurred, a session key as an encryption key and a decryption key to be used in the communication between the PC 10 and the printing device 30 is negotiated, and the encrypted communication between the PC 10 and the printing device 30 is performed with the session key.

It should be noted that in order to establish the above encrypted communication, it is required to exchange the electronic certificates between the PC 10 and the printing device 30 in advance, and operational setting for the encrypted communication such as checking authenticity of the electronic certificate must be made when the encrypted communication is started. However, such operations must be performed in every combination of the PC 10 and the printing device 30, which are complicated and troublesome.

Therefore, in the communication system I according to the present embodiment, the printing device 30 is adapted to appends information indicating status of the operational setting for encrypted communication to a packet to be returned to the PC 10. That is, when a searching packet to find devices provided in the network NT is transmitted from the PC 10, the printer 30 appends the information indicating the status of the operational setting between the PC 10 as the sender of the searching packet and the printing device 30 itself to a reply packet, which is transmitted to the PC 10 in response to the searching packet, and notifies the status of the operational setting to the PC 10.

Figure 3:
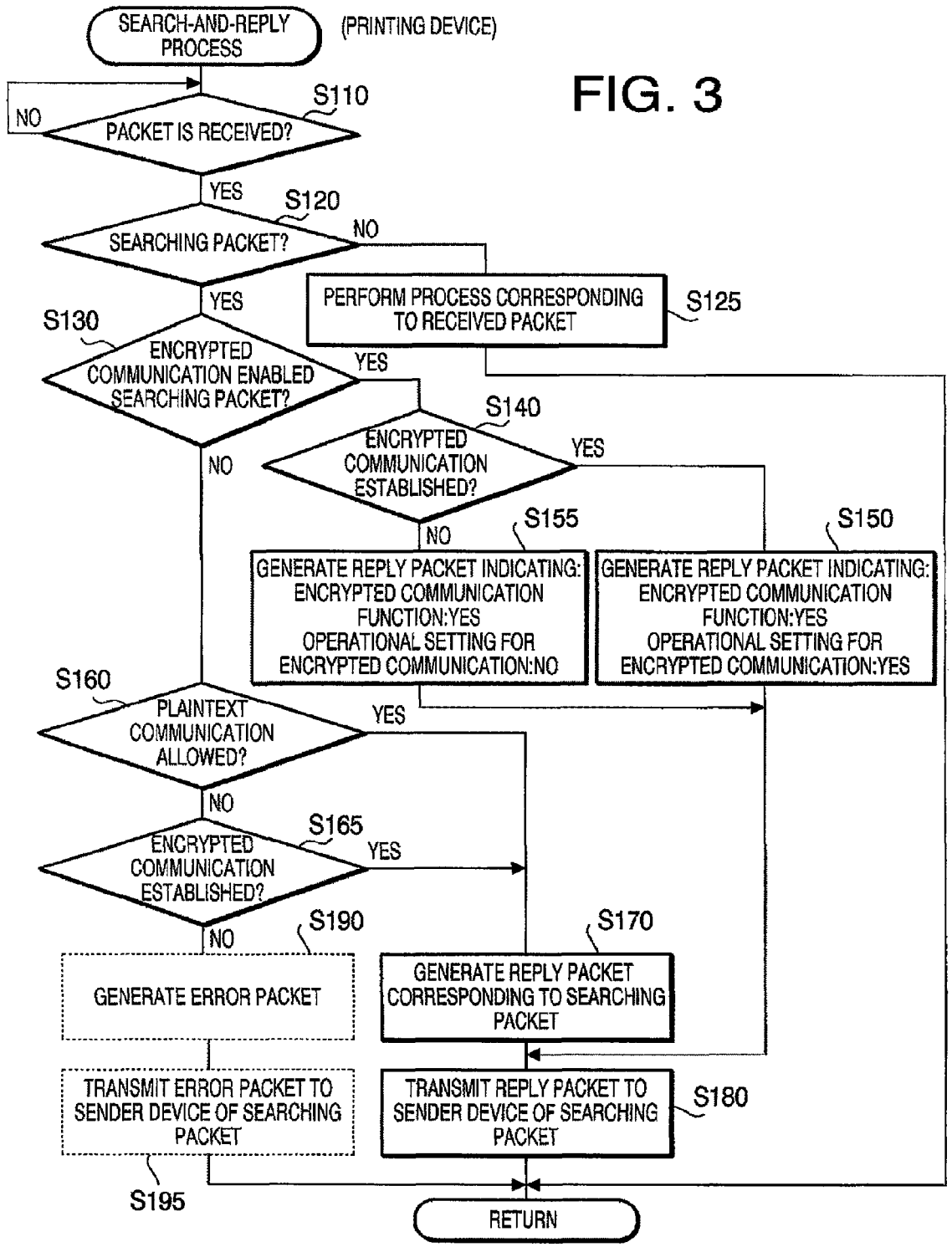
FIG. 3 shows a flowchart illustrating a search-and-reply process repeatedly performed by a control unit 31 of the printing device 30 according to the embodiment of the present invention.

A process for the above operation will be described hereinafter. FIG. 3 shows a flowchart illustrating a search-and-reply process repeatedly performed by the control unit 31 of the printing device 30 according to the embodiment of the present invention. When the search-and-reply process is initiated, the control unit 31 waits until it receives a packet from external devices via the communication interface 37 (S110). When a packet is received (S110: YES), the control unit 31 judges as to whether the received packet is a searching packet for retrieving a device transmitted in an SNMP protocol (S120).

The searching packet referred to herein is an SNMP packet of a GET type including query terms regarding a system name which is used when the PC run on Windows (registered trademark) OS (operating system) searches devices in a network. FIGS. 4A and 4B are schematic diagrams showing configurations of the searching packets according to the embodiment of the present invention. A parameter value required by the searching packet is specified by an OID (object identifier) which is a code assigned to each parameter.

FIG. 4A shows a conventionally known configuration of such a searching packet, and FIG. 4B shows a searching packet specifically configured to have query terms to obtain status (presence or absence) of the encrypted communication function and status (complete or incomplete) of the operational setting for encrypted communication. In the present embodiment, either type of the searching packets can be transmitted from the PC 10 as searching packets, and details of the searching packets will be explained later. It should be noted that the former searching packet shown in FIG. 4A includes the queries regarding the system name and the operational status. Hereinafter, the former packet is referred to as a normal searching packet in the present embodiment. On the other hand, the latter searching packet as shown in FIG. 4B includes queries regarding the system name, the status of encrypted communication function, and the status of the operational setting (as to whether the setting has been made) for encrypted communication. Hereinafter, the latter packet is referred to as an encrypted communication enabled encrypted communication enabled searching packet.

Referring back to FIG. 3, when it is determined that the received packet is a searching packet in S120 (S120: YES), the control unit 31 advances the process to step S130 and judges as to whether the received searching packet is an encrypted communication enabled searching packet. Specifically, it is judged as to whether the received packet includes the query for the status of encrypted communication and the status of the operational setting for encrypted communication.

In S130, if it is determined that the received packet is an encrypted communication enabled searching packet (S130: YES), in S140, the control unit 31 judges as to whether the sender device of the encrypted communication enabled searching packet is a device whose operational setting for encrypted communication has been made. The printing device 30 is provided in the NVRAM 31d with a list (hereinafter referred to as a "encryption enabled device list") indicating the PCs 10 in the network NT which have completed the operational setting and established the encrypted communication with the printing device 30 by, for example, exchanging the electronic certificates. The judgment as to whether the operational setting for encrypted communication of the sender device has been made is made based on an address of the sender device of the searching packet received by the printing device 30 (S140). If the address of the sender device is registered in the encryption enabled device list, it is determined that the operational setting for encrypted communication of the sender device has been made.

If it is determined that the operational setting for encrypted communication of the sender device has been made (S140: YES), the control unit 31 generates a reply packet including a system name of the printing device 30, a value "1", and another value 1. The system name of the printing device is included in the reply packet in response to the query for a system name, the first value "1" is included in response to the query for the status of the encrypted communication function in the reply packet to indicate that a function for the encrypted communication is equipped, and the second value "1" is included in response to the query for the status of the operational setting for encrypted communication in the reply packet to indicate the operational setting for encrypted communication has been made (S150). FIG. 5A is a schematic diagram showing a configuration of the reply packet generated in S150 corresponding to the encrypted communication enabled searching packet according to the embodiment of the present invention.

When the reply packet is generated in S150, the control unit 31 advances the process to S180 and transmits the reply packet to the sender device of the searching packet via the communication interface 37. Then, the search-and-reply process is temporary terminated.

In S140, if the address of the printing device 30 as the sender device is not registered in the encryption enabled device list, and the sender device of the encrypted communication enabled searching packet is judged to be a device with the operation settings for encrypted communication incomplete (S140: NO), the control unit 31 generates a reply packet including the system name of the printing device 30 in response to the query for the system name, the value "1" indicating that the encrypted communication function is equipped in response to the query for the status of the encrypted communication, and the another value "0" indicating that the operational setting for encrypted communication has not been made in response to the query for status of the operational setting for encrypted communication (S155). FIG. 5B is a schematic diagram showing a configuration of the reply packet generated in S155 corresponding to the encrypted communication enabled searching packet according to the embodiment of the present invention.

When the reply packet is generated as above, the control unit 31 advances the process to S180 and transmits the reply packet to the sender device of the searching packet via the communication interface 37. Then, the search-and-reply process is temporary terminated.

In S130, if it is determined that the received packet is a normal searching packet and not an encrypted communication enabled searching packet (S130: NO), the control unit 31 advances the process to S160 and judges based on the setting information stored in the NVRAM 31d as to whether plaintext communication is allowed. In the present embodiment, the printing device 30 is configured to restrict the plaintext communication by default in a factory preset mode.

In S160, if it is determined that the plaintext communication is allowed (S160: YES), the control unit 31 advances the process to S170 and generates a reply packet corresponding to the normal packet received and including the system name and the operational status of the printing device 30. FIG. 6A is a schematic diagram showing a configuration of the reply packet generated in S170 corresponding to the normal searching packet according to the embodiment of the present invention. It should be noted that in the reply packet shown in FIG. 6A includes a value "3" which indicates the operational status being in "idle state".

Upon completion of S170, the control unit 31 advances the process to S180 and transmits the reply packet to the sender device of the searching packet via the communication interface 37. Then, the search-and-reply process is temporary terminated.

In S160, if it is determined that the plaintext communication is restricted (S160: NO), the control unit 31 advances the process to SI 65 and judges as to whether the sender device of the normal searching packet is a device whose operational setting for encrypted communication has been made. That is, it is judged as to whether the address of the sender device is registered in the encryption enabled device list stored in the NVRAM 31d.

In S165, if it is determined that the sender device of the normal searching packet is a device whose operation setting for encrypted communication have been made (S165: YES), the control unit 31 generates a reply packet corresponding to the received normal packet including the system name and the operational status of the printing device 30 (S170) and transmits the reply packet to the sender device of the searching packet via the communication interface 37 (S180). Then, the search-and-reply process is temporary terminated.

In S165, if it is determined that the sender device of the normal searching packet is a device whose operation settings for encrypted communication have not been made (S165: NO), the control unit 31 advances the process to S190 and generates an error packet indicating that replies to the queries included in the searching packet are undetermined. FIG. 6A is a schematic diagram showing a configuration of the error packet generated in S190 corresponding to the normal searching packet according to the embodiment of the present invention. Upon completion of S190, the control unit 31 transmits the error packet generated in S190 to the sender device of the normal searching packet via the communication interface 37

(S195). Then, the search-and-reply process is temporary terminated, and the control unit 31 waits until a next packet is received (S110).

In S120, if the received packet is determined not to be a searching packet (S120: NO), the control unit 31 performs a process corresponding to the received packet (S125). Then, upon completion of the process, the search-and-reply process is temporary terminated, and the control unit 31 waits until a next packet is received (S110).

Figure 7:
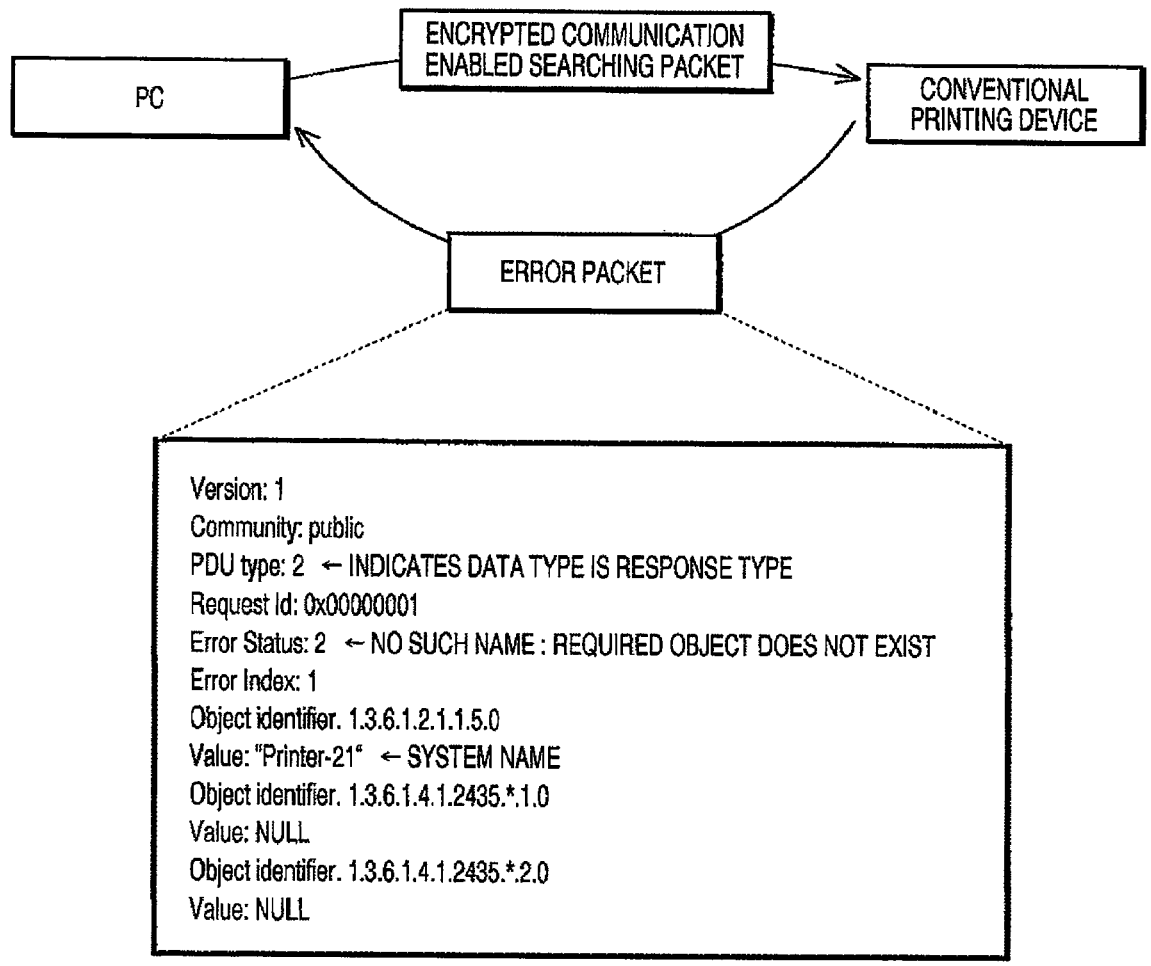
FIG. 7 is a schematic diagram showing a configuration of an error packet to be replied from a conventional printing device in response to the encrypted communication enabled searching packet according to the embodiment of the present invention.

It should be noted that a conventional printing device which is not enabled encrypted communication cannot reply a parameter value corresponding to the query when the encrypted communication enabled searching packet is received. Therefore, if the network NT includes the conventional printing device connected, the conventional printing device returns an error packet as a reply packet for the encrypted communication enabled searching packet to the sender device. The error packet includes a reply value indicating the system name in response to the query for the system name and no reply values for the status of encrypted communication and for the operational setting for encrypted communication. FIG. 7 is a schematic diagram showing a configuration of the error packet to be replied from the conventional printing device in response to the encrypted communication enabled searching packet according to the embodiment of the present invention.

It should be noted that when the conventional printing device receives a normal searching packet, a reply packet including the system name and the operational status in which error status is "0" as shown in FIG. 6A is returned to the sender device of the normal searching packet.

Figure 8:
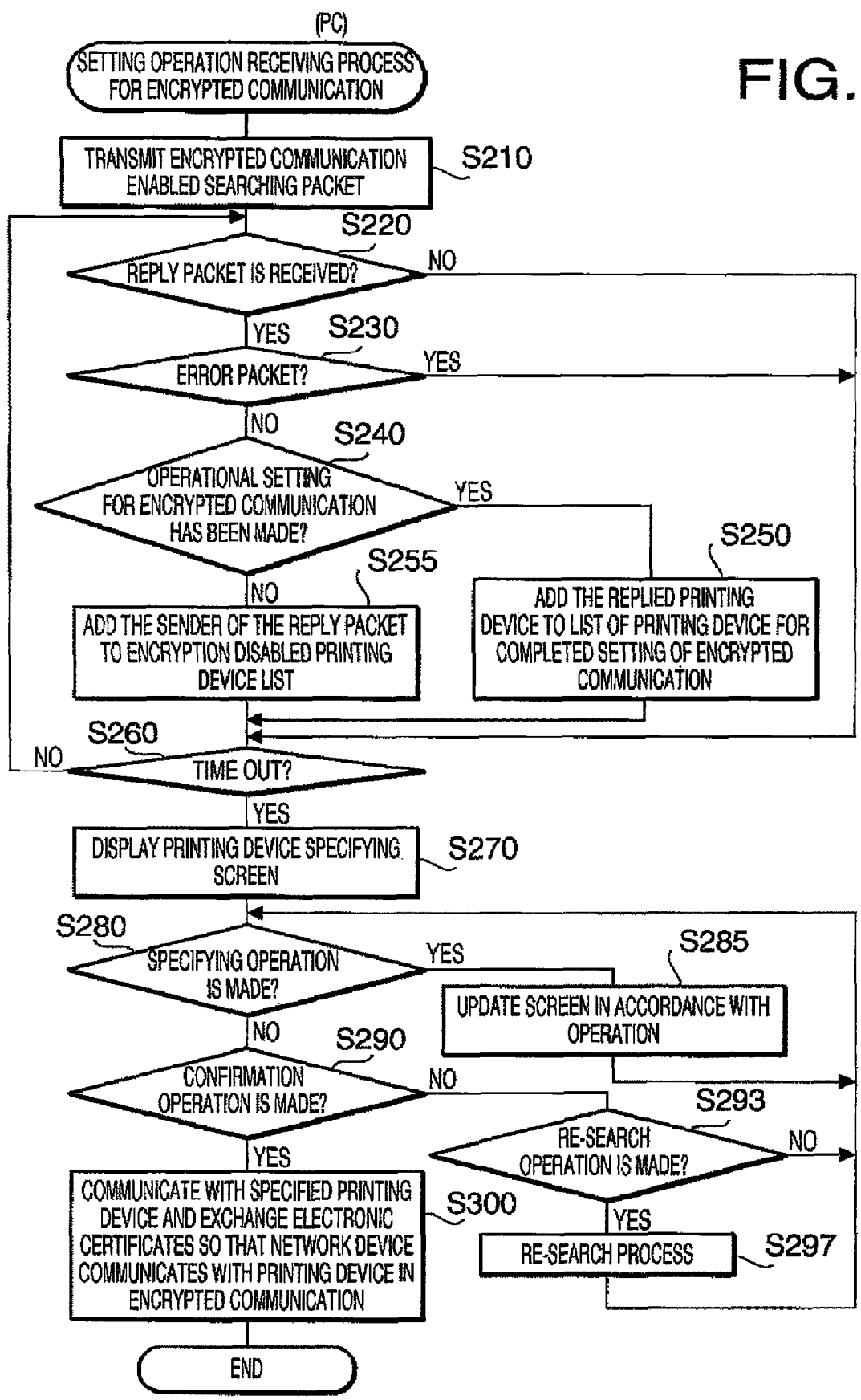
FIG. 8 is flowchart illustrating a setting operation receiving process for encrypted communication performed by a CPU 11 of the PC 10 according to the embodiment of the present invention.

Next, operations of the PC 10, which is capable of transmitting the aforementioned searching packets for encrypted communication and normal searching packets through the network NT, will be explained in detail. FIG. 8 is flowchart illustrating a setting operation receiving process for encrypted communication performed by the CPU 11 of the PC 10 according to the embodiment of the present invention.

When the setting operation receiving process for encrypted communication is initiated, the CPU 11 of the PC 10 creates an encryption enabled device list and an encryption disabled device list (which will be described hereinbelow) and broadcasts the encrypted communication enabled searching packets to the network NT via the communication interface 23 (S210). Upon completion of S210, the CPU 11 judges as to whether the reply packet corresponding to the broadcasted encrypted communication enabled searching packet is received (S220). If it is determined that the reply packet is not received (S220: NO), the process advances to S260, and the CPU 11 judges as to whether a predetermined time has elapsed. Thereafter, the process advances to S220 when it is judged that the predetermined time has not elapsed (S260: NO). In the above steps, the CPU 11 waits for the reply packet until the predetermined time elapses.

In S220, if it is determined that the reply packet is received (S220: YES), in S230, the CPU 11 judges as to whether the received reply packet is an error packet in accordance with a parameter value indicated in Error Status in the reply packet (S230). If it is determined that the reply packet is not the error packet (i.e. Error Status=0) (S230: NO), the process advances to S240. If it is determined that the reply packet is the error packet (i.e. Error Status≠0) (S230: NO), the process advances to S260.

In the present embodiment, the CPU 11 judges as to whether the received reply packet is transmitted form a network device other than the printing device 30 based on the information in the reply packet, and if it is determined that the reply packet is transmitted form the network device other than the printing device 30, the reply packet is handled similarly to the error packet. Specifically, if the received reply packet is transmitted from the device other than the printing device 30, it is determined to be YES in S230, and the process advances to S260. Additionally, in the present embodiment, if the received reply packet is transmitted from a printing device without the encrypted communication function, it is also determined to be YES in S230, and the process advances to S260 without exception.

In S240, the CPU 11 judges as to whether the operational setting for encrypted communication between the PC 10 itself and the sender device of the reply packet has been made based on the value in the received reply packet representing the status of the operational setting for encrypted communication. If it is determined that the operational setting for encrypted communication of the printing device 30 has been made (S240: YES), identification, such as an IP address and a host name, of the printing device 30 as the sender of the reply packet is added to a list of devices (hereinafter referred to as an "encryption enabled device list") (S250). The encryption enabled device list is a list newly generated when the setting operation receiving process for encrypted communication is initiated and indicates devices in the network NT of which operational setting for encrypted communication has been made and of which encryption communication with the PC 10 is established.

In S240, if it is determined that the operational setting for encrypted communication with the printing device 30 has not been made (S240: NO), the CPU 11 adds the identification of the printing device 30 as the sender of the reply packet to a list of devices with incomplete settings of encrypted communication (hereinafter referred to as an "encryption disabled device list") (S255). The encryption disabled device list is a list newly generated when the setting operation receiving process for encrypted communication is initiated and indicates devices in the network NT of which operational setting for encrypted communication has not been made and of which encrypted communication with the PC 10 is not established.

Upon completion of S250 and S255, the CPU 11 advances the process to S260 and performs the steps S230 through S260 for every time the reply packet is received until the predetermined time elapses.

Figure 9:
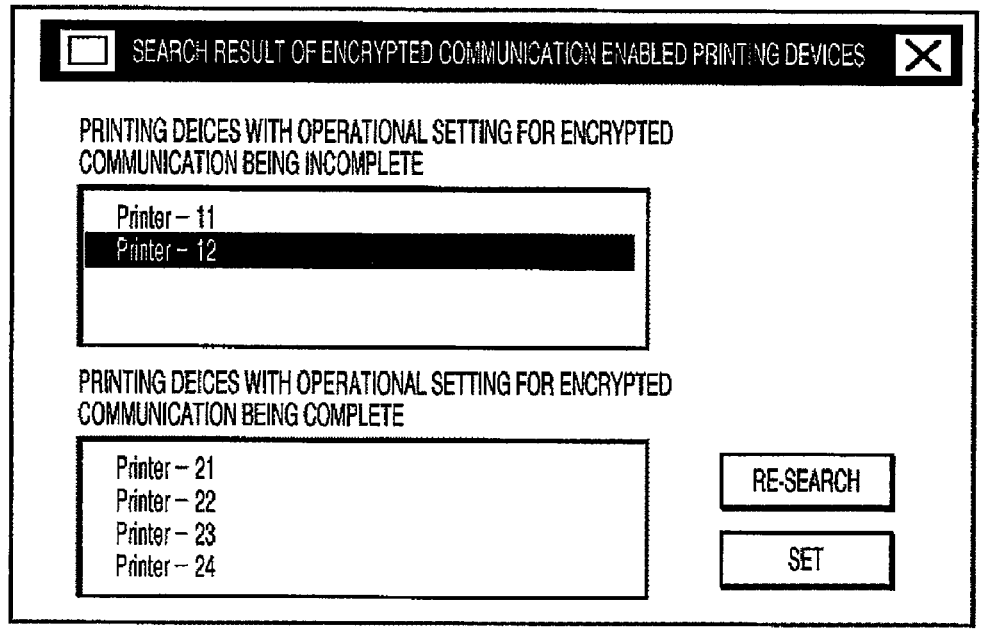
FIG. 9 illustrates a printing device specifying screen according to the embodiment of the present invention.

When it is determined that the predetermined time has elapsed (S260: YES), the CPU 11 displays a printing device specifying screen on the display unit 19 (S270). The printing device specifying screen is generated based on the encryption enabled printing device list and the encryption disabled device list and recognizably indicates the printing device 30 with its operation settings completed and the printing device 30 with its operation settings uncompleted. FIG. 9 illustrates a printing device selection screen displayed in S270 according to the embodiment of the present invention.

As shown in FIG. 9, the printing device specifying screen in the present embodiment is a GUI (Graphical User Interface) based configuration. The CPU 11 recognizes an operation from a user by a location of the pointer which corresponds relatively to a location of the pointing device of the operating unit 21 and clicking to the pointing device and performs a process corresponding to the operation given by the user in the following processes. It should be noted that, in the printing device specifying screen displayed in S270, one of the printing devices 30 displayed is specified by default, and a symbol of the printing device 30 (for example, a character string indicating a name of the printing device 30) is highlighted.

Upon completion of S270, the CPU 11 advances the process to S280 and judges as to whether the user selects a symbol of another one of the printing devices 30 displayed on the printing device specifying screen (S280) If it is determined that another symbol is specified, the CPU 11 updates the printing device specifying screen so that the newly specified symbol is highlighted (S285). Then, the CPU 11 advances the process to S280 and waits until a next operation is made by the user.

In S280, if it is determined that no operation to specify a symbol is entered (S280: NO), in S290, the CPU 11 judges as to whether an operation to confirm the printing device 30 of which symbol is highlighted in S280 is entered by the user. Specifically, it is judged as to whether a "set" button displayed in the printing device specifying screen is pressed (clicked) by the user while the symbol of the printing device 30 is highlighted. If the "set" button is pressed (S290: YES), the process advances to S300.

In S300, the CPU 11 accesses the printing device 30 of which symbol is highlighted (selected) during the confirmation operation in S290 via the network NT and exchanges electronic certificates with the printing device 30. Specifically, the CPU 11 acquires an electronic certificate (such as a CA (certificate authority) certificate) of the printing device 30, which is required to check authenticity of an electronic certificate transmitted during an SSL handshake from the printing device 30 and provides an electronic certificate (such as a CA certificate) of the PC 10, which the printing device 30 requires to check authenticity of the electronic certificate transmitted during the SSL handshake from the PC 10 to the printing device 30.

When the electronic certificate is acquired from the printing device 30, the CPU 11 registers the electronic certificate in the hard disk drive 17 as a CA certificate for checking authenticity of the electronic certificate transmitted from the printing device 30 during the SSL handshake. Then the CPU 11 closes the printing device specifying screen and terminates the setting operation receiving process for encrypted communication.

Figure 10:
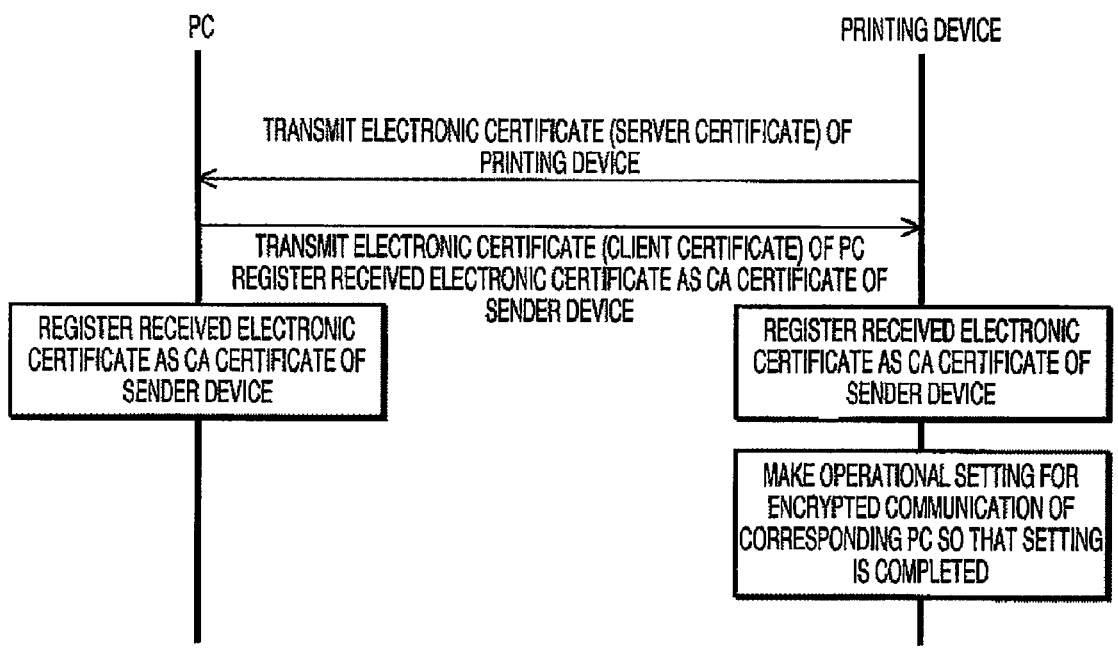
FIG. 10 is a ladder chart showing setting procedures for encrypted communication between the PC 10 and the printing device 30 according to the embodiment of the present invention.

FIG. 10 is a ladder chart showing setting procedures for encrypted communication between the PC 10 and the printing device 30 in S300 according to the embodiment of the present invention. While the PC 10 performs the aforementioned process, the printing device 30 on the other end of the communication acquires the electronic certificate as CA certificate of the PC 10 which is required to check authenticity of the electronic certificate transmitted during the SSL handshake from the PC 10 and provides the electronic certificate as CA certificate of the printing device 30, which the PC 10 requires to check authenticity of the electronic certificate transmitted during the SSL handshake from the printing device 30 to the PC 10.

When the electronic certificate is acquired from the PC 10, the printing device 30 registers the received electronic certificate as CA certificate in the NVRAM 31d of the printing device 30 itself. In addition, a node address of the PC 10 which currently exchanged the electronic certificates as CA certificates with the printing device 30 is added (registered) in the encryption enabled device list in the NVRAM 31d. Thus, the operational setting for encrypted communication between the PC 10 and the printing device 30 is changed (completed).

In S290 in FIG. 8, if it is determined that the operation to confirm the printing device 30 of which symbol is highlighted in S280 is not entered by the user (S290: NO), the CPU 11 advances the process to S293 and judges as to whether an operation for re-searching the printing device 30 is made. Specifically, the CPU 11 judges as to whether a "search again" button on the printing device specifying screen (FIG. 9) is pressed.

If it is judged that the operation for re-searching is made (S293: YES), a re-search process is performed, and the printing device specifying screen including an updated list of the printing devices 30 is displayed on the display unit 19 (S297). Upon completion of S297, the process returns to S280. In case none of the selection operation, confirmation operation and re-search operation is made, it is judged to be NO in S293, and the CPU 11 waits until any of the aforementioned operation is made.

Figure 11:
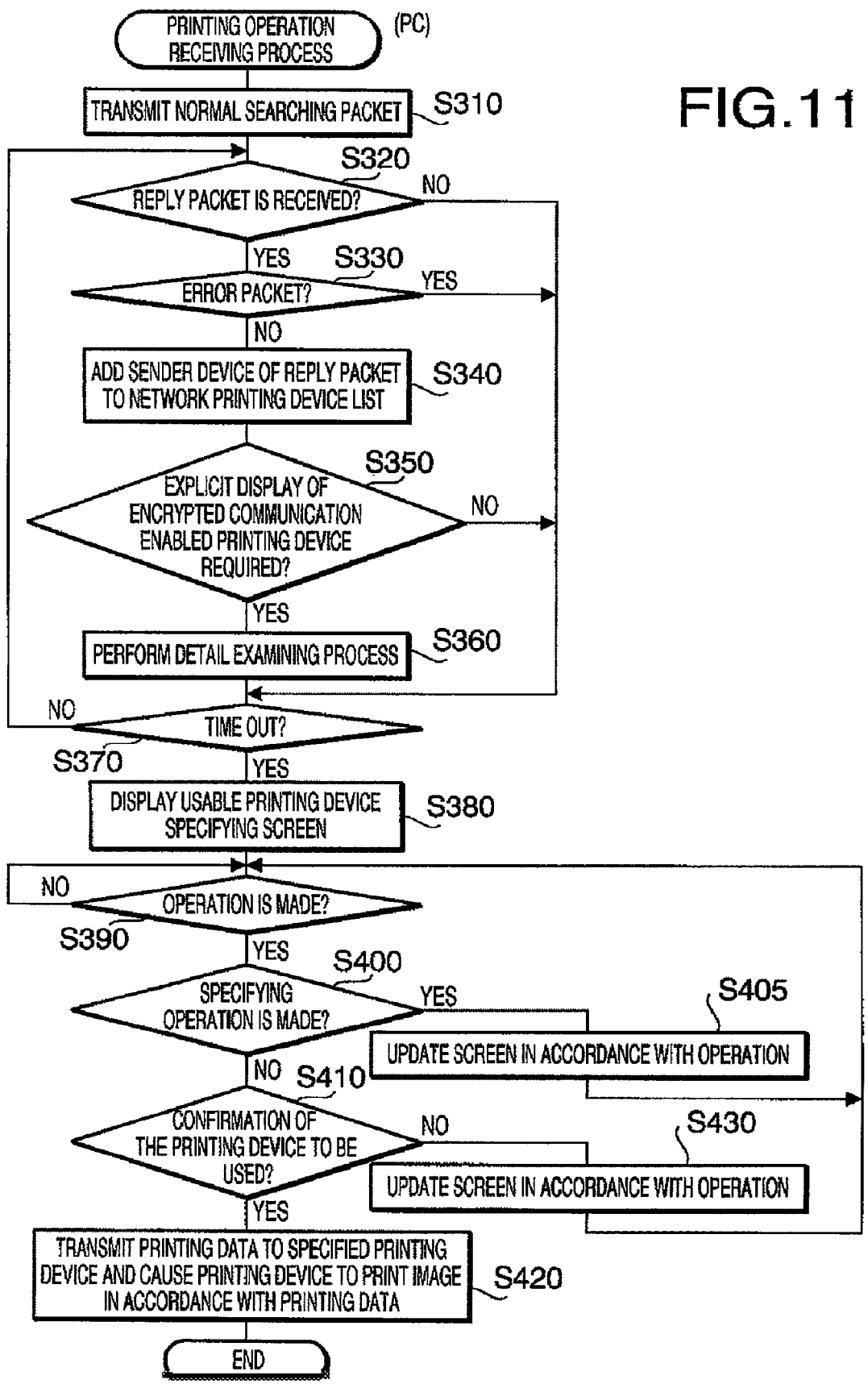
FIG. 11 is a flowchart illustrating a printing operation receiving process performed by the CPU 11 of the PC 10 according to the embodiment of the present invention.

While the above-described setting operation receiving process for encrypted communication is performed, the CPU 11 also performs a printing operation receiving process as shown in FIG. 11 in response to operations for printing various data such as document data and image data inputted by the user using application programs such as word processor software and image processing software. In the printing operation receiving process, the CPU 11 transmits data to be printed (print data such as document data and image data) to the printing device 30 designated by the user among the plurality of printing devices 30 connected to the network, and causes the designated printing device 30 to print the print data. FIG. 11 is a flowchart illustrating the printing operation receiving process performed by the CPU 11 of the PC 10 according to the embodiment of the present invention.

When the printing operation receiving process is initiated, the CPU 11 firstly broadcasts a normal searching packet to the network NT via the communication interface 23 (S310). Upon completion of S310, the CPU 11 judges as to whether a reply packet corresponding to the broadcasted normal searching packet is received (S320). If it is determined that the reply packet is not received (S320: NO), the CPU 11 advances the process to S370 and judges as to whether a predetermined time has elapsed after the normal searching packet was transmitted (S370). If it is determined that the predetermined time has not elapsed (S370: NO), the process returns to S320. Thus, the CPU 11 waits for the reply packet until the predetermined time elapses.

In S320, if it is determined that the reply packet is received (S320: YES), the CPU 11 judges as to whether the received reply packet is an error packet in accordance with the parameter value of Error Status in the reply packet (S330). If it is determined that the reply packet is not the error packet (i.e. Error Status=0) (S330: NO), the process advances to S340. If it is determined that the reply packet is the error packet (i.e. Error Status≠0) (S330: YES), the process advances to S370. In the present embodiment, if the received reply packet is transmitted from a network device other than the printing device 30, it is judged to be YES in S330, and the process advances to S370 without exception.

In S340, the CPU 11 adds the printing device 30 as the sender of the reply packet to a list of printing devices within the network NT (hereinafter referred to as an "network printing device list"). The network printing device list is a list newly generated when the printing operation receiving process is initiated and indicates the printing devices 30 within the network NT which have returned the reply packets in response to the normal searching packets. Upon completion of S340, the CPU 11 advances the process to S350 and judges as to whether it is required to display the printing devices 30 which are capable of the encrypted communication explicitly display on the display unit 19. In the present embodiment, a driver program to implement the printing operation receiving process includes a program to switch the explicit display and implicit display of the printing devices 30 which are capable of the encrypted communication according to a requirement set by the user and to store the requirement setting in the NVRAM 31d. In S350, it is judged as to whether the explicit display is required in accordance with the requirement setting stored in the NVRAM 31d.

Figure 12:
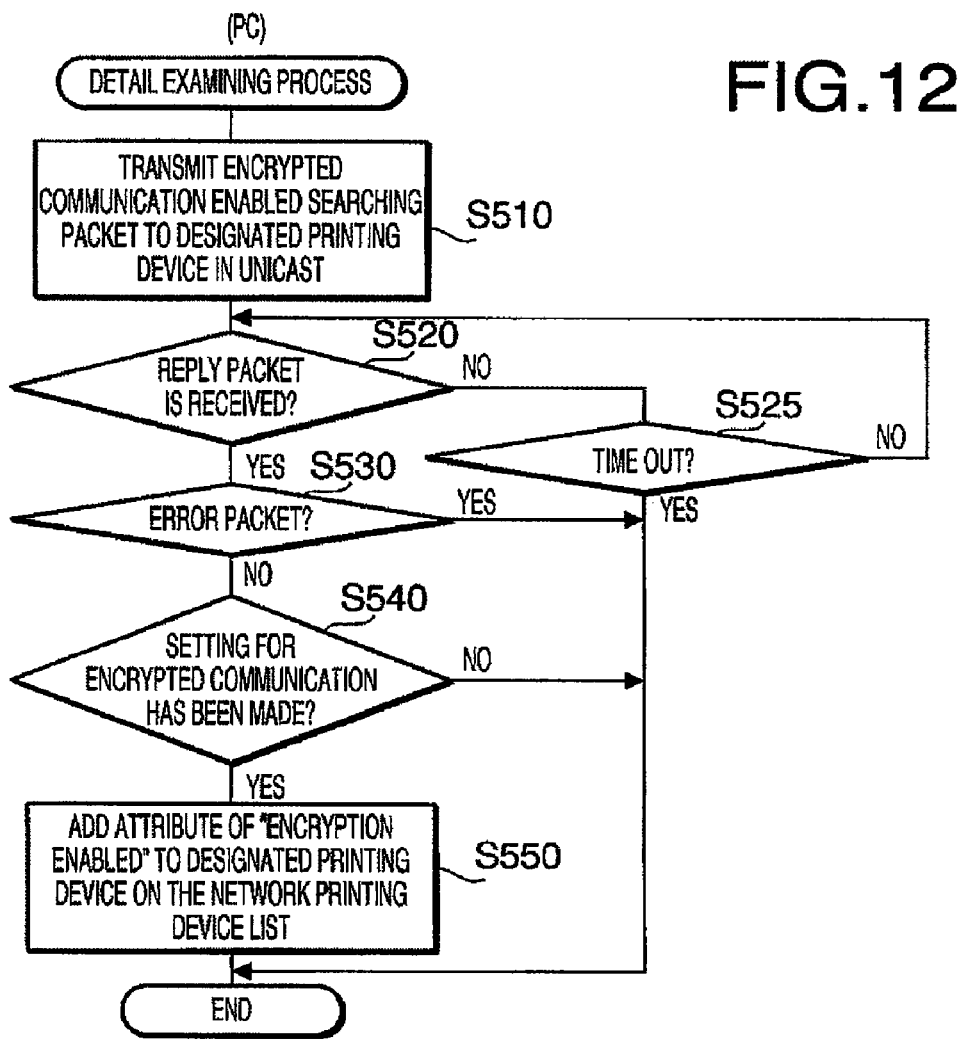
FIG. 12 is a flowchart illustrating a detail examining process performed by the CPU 11 of the PC 10 according to the embodiment of the present invention.

In S350, if it is determined that the explicit display is not required (S350: NO), the process advances to S370. If it is determined that the explicit display is required (S350: YES), the process advances to S360. Further, in S360, the printing device 30 as the sender of the received reply packet is designated as an object to be examined in a detail examining process, which is shown in FIG. 12. FIG. 12 is a flowchart illustrating the detail examining process performed by the CPU 11 of the PC 10 in parallel with the printing operation receiving process according to the embodiment of the present invention.

When the detail examining process is initiated, the CPU 11 transmits the encrypted communication enabled searching packet to the printing device 30 which is designated as the object to be examined in unicast via the communication interface 23 (S510), and waits until a reply packet corresponding to the encrypted communication enabled searching packet is received (S520). If no reply packet is received (S520: NO), the CPU 11 waits until a predetermined time elapses after the encrypted communication enabled searching packet is transmitted (S525).

In S520, if it is determined that the reply packet is received (S520: YES), the process advances to S530. If it is determined that the predetermined time has elapsed after the encrypted communication enabled searching packet was transmitted (S525: YES), the detail examining process is terminated.

In S530, the CPU 11 judges as to whether the received reply packet is an error packet in accordance with the parameter value of Error Status in the reply packet. If it is determined that the reply packet is not the error packet (i.e. Error Status=0) (S530: NO), the process advances to S540. If it is determined that the reply packet is the error packet (i.e. Error Status≠0) (S530: YES), the detail examining process is terminated.

In S540, the CPU 11 judges as to whether the operational setting for encrypted communication between the PC 10 itself and the sender of the reply packet has been made based on the value in the received reply packet representing the status of the operational setting for encrypted communication. If it is determined that the operational setting for encrypted communication has been made (S540: YES), the CPU 11 writes an attribute of the printing device 30 as the examination object in the network printing device list which was generated in the printing operation receiving process being performed in parallel with the detail examining process. Specifically, an attribute that the printing device 30 as the examination object is "encryption enabled" is written (S550). Upon completion of S550, the detail examining process is terminated. In S540, if it is determined that the operational setting for encrypted communication has not been made (S540: NO), the CPU 11 terminates the detail examining process.

Thus, in the detail examining process, it is judged as to whether the designated printing device 30 is a printing device whose operational settings for encrypted communication have been made, and if the designated printing device 30 is the printing device whose operational setting for encrypted communication has been made, the result of the judgment is added to the network printing device list.

Returning to the printing operation receiving process (FIG. 11), upon completion of S360, the CPU 11 advances the process to S370 and judges as to whether the predetermined time has elapsed after the normal searching packets were transmitted. If the predetermined time has not elapsed, the process returns to S320. Then, the CPU 11 waits until a next reply packet is received. If no reply packet is receive, in S370, the CPU waits until the predetermined time elapses after the normal searching packets were transmitted.

In addition, in S370, if it is determined that the predetermined time has elapsed after the normal searching packets were transmitted (S370: YES), the CPU 11 advances the process to S380 and generates and displays a usable printing device specifying screen, wherein the user can specify one of the printing devices 30 to be used for printing based on the aforementioned the network printing device list, on the display unit 19.

Figure 13:
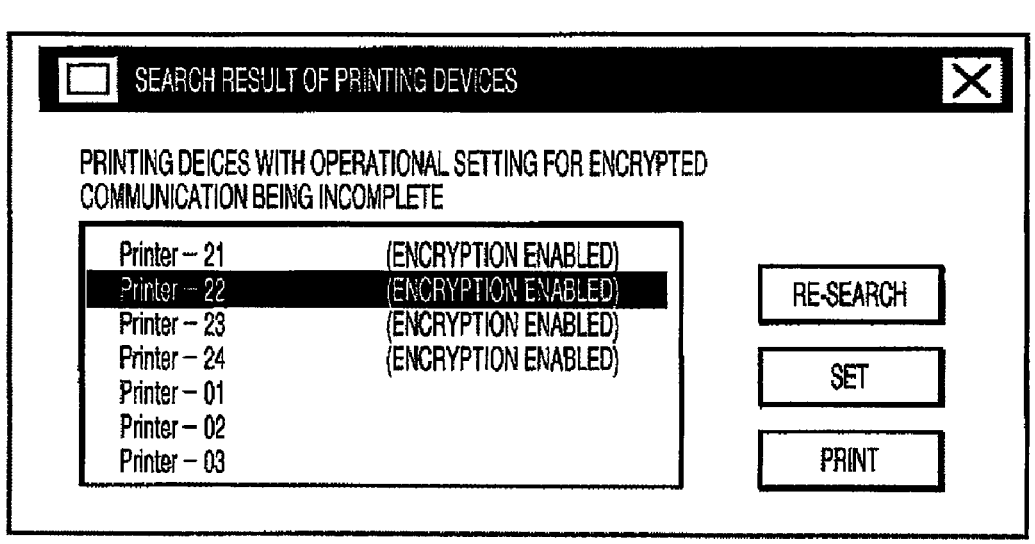
FIG. 13 is a schematic diagram illustrating a configuration of a usable printing device specifying screen according to the embodiment of the present invention.

FIG. 13 is a schematic diagram illustrating a configuration of the usable printing device specifying screen displayed in S380 according to the embodiment of the present invention. As shown in FIG. 13, the list of the printing devices 30 which responded to the normal searching packets is displayed in the usable printing device specifying screen displayed on the display unit 19 in S380. Furthermore, character strings "encryption enabled" in parentheses, representing the corresponding printing devices 30 are capable of encrypted communication are also displayed in the list.

Upon completion of S380, the CPU waits until the user operation to the usable printing device specifying screen is entered (S390). When the user operation is entered (S390: YES), it is judged as to whether the user operation is an operation to specify the printing device 30 to be used for printing (S400). Specifically, if a symbol indicating the printing device 30 (i.e., a character string indicating a name of the printing device 30) displayed on the usable printing device specifying screen is selected by the user, it is determined that the operation to specify the printing device to be used for printing is entered (S400: YES), and the usable printing device specifying screen is updated so that the specified symbol is highlighted (8405). Then, the process returns to S390, and the CPU 11 waits until a next operation is made.

In S400, if it is determined that the user operation is not an operation to specify the printing device to be used (S400: NO), the CPU 11 advances the process to S410, and judges as to whether the user operation is an operation for confirming the printing device to be used. In this step, if the user operation is made by pressing a "print" button displayed on the usable printing device specifying screen, it is determined that the confirming operation for printing is made (S410: YES), and the process advances to S420. When an operation other than the above is made, it is determined to be NO in S410, and the process advances to S430.

In S420, the CPU 11 converts the data (i.e., document data and image data, etc.) generated in the application program which called the printing operation receiving process into the printing data corresponding to the printing device 30 as the printing device to be used specified (highlighted) in the confirmation operation. Then the CPU 11 transmits the printing data to the printing device 30 via the communication interface 23 which causes the printing device 30 as the printing device to be used to print the image according to the printing data on recording sheets (S420).

If the printing device 30 as the printing device to be used is capable of encrypted communication whose operational setting has been made, the SSL handshake is performed prior to the transmission of the printing data. The printing data is subsequently encrypted and transmitted from the PC 10 to the printing device 30 using the encrypted communication. Upon completion of S420, the CPU 11 terminates the printing operation receiving process.

Additionally, in S430, the CPU 11 performs the other processes corresponding to the user operation. For example, in S410, when the "re-search" button on the usable printing device specifying screen is pressed, the CPU 11 advances the process to S430 and broadcasts the normal searching packets to the network NT and updates the usable printing device specifying screen with the latest information. Upon completion of this step, the process returns to S390, and the CPU 11 waits until a next operation is made.

The communication system 1 according to the present embodiment is explained as above. However, in order to use the printing device 30 in the communication system 1 according to the present embodiment, it is necessary to make the operational setting for encrypted communication between the printing device 30 and the PC 10 by for example exchanging electronic certificates when the printing device 30 receives the searching packet (an encrypted communication enabled searching packet) from the PC 10 (S130 in FIG. 3: YES), it is judged as to whether the operational setting for encrypted communication between the sender device PC 10 and the printing device 30 has been made (S140). If the operational setting has not been made, the reply packet including a value representing the operational setting for encrypted communication has not been made, is generated and transmitted (S155, S180). On the other hand, if the operational setting has been made, the reply packet including a value representing the operational setting for encrypted communication has been made is generated and transmitted (S150, S180).

Therefore, according to the communication system 1 in the present embodiment including the printing device 30 capable of encrypted communication, the PC 10 capable of transmitting the searching packet (the encrypted communication enabled searching packet) can identify the printing device 30 whose operational setting has not been made and the printing device 30 whose operational setting has been made among the plurality of printing devices 30 on the network in a simple manner.

Further, according to the present embodiment, the user can easily recognize as to whether the operational settings of the printing devices 30 are complete by simple operations such as transmitting the encrypted communication enabled searching packets and receiving the reply packets corresponding to the searching packets. Therefore, the PC 10 can display the list of the printing devices 30 which are connected to the network NT, wherein the printing devices 30 with the operational settings for encrypted communication incomplete and the printing devices 30 with the operational settings complete can be explicitly distinguished.

Therefore, according to the present embodiment the user of the PC 10 can recognize the status of the operational setting for encrypted communication between the printing device connected to the network and the PC 10 easily.

Furthermore, in the communication system 1 in the present embodiment, the printing device 30 is required to make the operational setting for encrypted communication for every PC 10 individually however, each printing device 30 identifies the sender device of the searching packet, judges as to whether the operational setting for encrypted communication between the sender device and the printing device 30 itself has been made, and includes the result of the judgment in the reply packet to notify the sender device of the searching packet of the result. As described above, in the present embodiment, the printing device 30 transmits the reply packet including individual information exclusively for the PC 10 as the sender of the searching packet, so that the PC 10 as the sender device of the searching packet can display the identifiable information to the user regarding the printing devices whose operational settings have not been made and the printing devices whose operational settings have been made, without extracting the individual information from the information in the reply packet on the display unit 19.

Further, in the present invention, an operation for appending the information regarding the status of the operational setting for encrypted communication to the reply packet is performed only when the explicit query is included in the searching packet (i.e., when the received searching packet is the encrypted communication enabled searching packet). If the normal searching packet which has no explicit query is transmitted, the printing device 30 changes its reply method, and no information regarding the status of the operational setting for encrypted communication is appended to the reply packet.

Specifically, in the search-and-reply process (FIG. 3), if the operational setting for encrypted communication between the sender device of the searching packet and the printing device 30 has been made (S165: YES), the reply packet corresponding to the searching packet is transmitted (S170, S180). If the operational setting for encrypted communication between the sender device of the searching packet and the printing device 30 has not been made (S165: NO), an error packet is transmitted for the searching packet (S190, S195).

With the above operation, the PC 10 as the sender device of the searching packet makes the printing device 30 whose operational setting for encrypted communication has not been made not to be listed on the usable printing device specifying screen. Therefore, according to the present embodiment, the user can be prevented from designating an unavailable printing device 30 whose operational setting for encrypted communication has not been made as a printing device to be used at the time of printing the data.

Furthermore, in the present invention, when the printing device specifying screen, wherein the user can identify the printing device 30 whose operational setting has not been made and the printing device 30 whose operational setting has been made, is displayed on the display unit 19, the PC 10 displays a list including the printing devices 30 whose operational settings for encrypted communication have not been made and another list including the printing devices 30 whose operational settings for encrypted communication have been made, separately from each other on the display unit 19, so that the user can recognize the printing devices 30 with the operational settings for encrypted communication complete or incomplete easily. Therefore, according to the present embodiment, the information regarding the operational setting for encrypted communication can be notified to the user in a simple manner.

Further, since the operational setting for encrypted communication between the PC 10 and the printing device 30 in the present embodiment can be implemented easily by entering operations through the printing device specifying screen, the setting operations can be performed easily after the setting status is known, which causes the user to operate these operations in an easier manner.

Although examples of carrying out the invention have been described, those skilled in the art will appreciate that there are numerous variations and permutations of the communication system that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in S165 of the search-and-reply process (FIG. 3), if it is determined that the sender device of the normal searching packet is a device whose operational setting for encrypted communication has been made (S165: NO), an error packet indicating that replies to the queries included in the searching packet are undetermined is generated (S190), and the error packet is returned to the sender device of the searching packet. Further, when the sender device of the normal searching packet is judged to be a device whose operational setting has not been made (S165: NO), it is also possible to configure the printing device 30 to terminate the search-and-reply process without performing S190 and S195. Specifically, the printing device 30 may be configured to discard the normal searching packet and not to reply to the packet, when the received normal searching packet is transmitted form the PC 10 whose operational setting for encrypted communication has not been made.

It should be noted that with the printing device 30 as configured above, the printing device 30 which is denied the access during the SSL handshake is not displayed in the usable printing device specifying screen displayed in the display unit 19 of the PC 10, similarly to the case when the error packet is transmitted from the printing device 30, so that only available printing devices 30 are displayed on the usable printing device specifying screen for the user to select.

What is claimed is:

1. A network device comprising:
one or more processors; and
one or more memories, storing instructions that, when executed by the one or more processors, cause the network device to perform the following:
communicate with a plurality of information processing devices connected to a network and exchange an electronic certificate owned by the network device and electronic certificates owned by the plurality of information processing devices to authorize encrypted communication between the network device and the plurality of information processing devices;
store a device list containing device identification information of information processing devices, the device list identifying information processing devices that have been authorized for encrypted communications with the network device;
receive a searching packet from one of the plurality of information processing devices,
determine whether the searching packet includes a query to obtain information indicating whether encrypted communication between the network device and the one of the plurality of information processing devices has been authorized;
in response to determining that the searching packet includes the query.
judge whether encrypted communication between the network device and the one of the plurality of information processing devices has been authorized, based on whether identification information of the one of the plurality of information processing devices is stored in the device list;
generate a reply packet; and
transmit the reply packet to the one of the plurality of information processing devices,
wherein, in response to judging that the identification information of the one of the plurality of information processing devices is not stored in the device list, the step of generating generates a reply packet that includes information identifying the network device and information indicating that the encrypted communication between the network device and the one of the plurality of information processing devices has not been authorized, and
wherein, in response to judging that the identification information of the one of the plurality of information processing devices is stored in the device list, the step of generating generates a reply packet that includes information identifying the network device and information indicating that the encrypted communication between the network device and the one of the plurality of information processing devices has been authorized; and
in response to determining that the searching packet does not include a query to obtain information regarding whether an operation setting for encrypted communication between the network device and the one of the plurality of information processing devices has been authorized,
determine whether plaintext communication is authorized;
determine whether encrypted communication between the network device and the one of the plurality of information processing devices has been authorized; and
generate and transmit a reply packet corresponding to the searching packet, if the plaintext communication is authorized or encrypted communication between the network device and the one of the plurality of information processing devices has been authorized.

2. The network device according to claim 1,
wherein the instructions further include instructions to authorize encrypted communication on an information processing device basis; and
wherein the judging judges whether the encrypted communication is authorized between the information processing device as a sender of the searching packet and the network device on a received searching packet basis.

3. The network device according to claim 1, the instructions further comprising instructions that, when executed by the one or more processors, cause the network device to perform the following:
judge whether the received searching packet is a specific searching packet including a request to query a status of encrypted communication,
and generate one of the first reply packet and the second reply packet when the received searching packet is the specific searching packet.

4. The network device according to claim 3,
wherein the instructions further include instructions that, when executed by the one or more processors, causes the network device to generate an error packet as the one of the first reply packet and the second reply packet when the packet the received searching packet is not the specific searching packet, and when the encrypted communication has not been authorized.

5. The network device according to claim 3, wherein the instructions further include instructions that, when executed by the one or more processors, cause the following to occur:
prevent responding to the received searching packet when the received searching packet is not the specific searching packet, and when encrypted communication has not been authorized.

6. The network device according to claim 5,
wherein the instructions further include instructions that, when executed by the one or more processors, cause the following to occur: discard the received searching packet when the received searching packet is not the specific searching packet, and when the encrypted communication has not been authorized.

7. The network device of claim 1, wherein the device list includes node addresses for information processing devices having authorized encrypted communications with the network device.

8. The network device of claim 7, wherein the node address is an Internet Protocol (IP) address.

9. The network device of claim 1, wherein the instructions further include instructions that, when executed by the one or more processors, cause the network device to consult the device list to locate a node address of an information processing device that has requested an encrypted print communication with the network device.

10. The method of claim 1, further comprising:
receiving a second searching packet;
determining that the second searching packet does not include a query to obtain information regarding whether encrypted communication between the network device and a sender of the second searching packet is authorized, and in response to such a determination, determine whether plaintext communication is authorized between the network device and the sender of the second searching packet; and
transmitting a second reply packet corresponding to the second searching packet and the determination.

11. An information processing device comprising:
one or more processors; and
one or more memories, storing instructions that, when executed by the one or more processors, causes the information processing device to perform the following:
communicate with a plurality of network devices connected to a network and exchange an electronic certificate owned by the information processing device and an electronic certificate owned by each of the network devices to authorize encrypted communication between the information processing device and each of the network devices;
transmit a searching packet via the network to search for the network devices in the network, the searching packet including a query to obtain information regarding whether use of an encryption function to communicate with the information processing device has been previously authorized based on whether the information processing device is identified in an encryption enabled device list stored at the network device;
receive a reply packet transmitted from one of the network devices via the network in response to the searching packet, the reply packet including status information indicating one of completion and incompletion of an encrypted communication authorization process between the information processing device and the one of the network devices;
judge completion and incompletion of the encrypted communication authorization process between the information processing device and the one of the network devices as a sender of the reply packet, based on the status information included in the reply packet transmitted from the one of the network devices and received by the reply packet receiving unit;
display, on a display unit, a list of the network devices provided in the network on a display device, wherein the list of the network devices identifies a status of encrypted communication authorization between the information processing device and each of the network devices;

transmit a second searching packet via the network to search for network devices in the network, the second searching packet omitting a query to obtain information regarding whether an encryption function to communicate with the information processing device has been previously authorized, and receive a reply packet if plaintext communication is authorized or if the encryption function to communicate with the information processing device has been previously authorized.

12. The information processing device according to claim 11,
wherein the network devices in which encrypted communication with the information processing device has not been authorized and the network devices in which the encrypted communication with the information processing device has been authorized are explicitly distinguished on a network device basis in the list of the network devices.

13. The information processing device according to claim 12,
wherein the displayed list displays a first list and a second list of the network devices provided in the network, the first list identifying the network devices in which encrypted communication with the information processing device has not been authorized and plaintext communication is authorized, and the second list identifying the network devices in which the encrypted communication with the information processing device has been authorized, wherein the list displays the first list separately from the second list.

14. The information processing device according to claim 11, wherein the instructions further comprise instructions that, when executed by the one or more processors, causes the information processing device to perform the following:
communicate with a network device selected by a user from the displayed list of network devices, and establish an operational setting for encrypted communication between the network device and the information processing device.

15. The information processing device of claim 11, wherein the encryption enabled device list includes node addresses for network devices having authorized encrypted communications with the information processing device.

16. The information processing device of claim 15, wherein the node address is an Internet Protocol (IP) address.

17. A non-transitory computer readable storage medium storing computer readable instructions that, when executed, cause the following to occur:
transmitting a searching packet via a network to search for network devices in the network, the searching packet including a query to obtain information regarding whether encrypted communication between the information processing device and the one of the plurality of network devices is authorized based on whether the information processing device is identified in an encryption enabled device list stored at the network device;
receiving a reply packet transmitted from one of the network devices via the network, the reply packet being transmitted from the one of the network devices in response to the searching packet and including status information indicating one of completion and incompletion of the authorization for encrypted communication to be established between the computer and the one of the network devices;
judging completion and incompletion of the authorization for encrypted communication between the computer and the one of the network devices as a sender of the reply packet, based on the status information included in the reply packet transmitted from the one of the network devices and received in the step of receiving the reply packet; and displaying a list of the network devices provided in the network on a display device based on the judgment made in the step of judging, wherein the list of the network devices identifies a status of the authorization for encrypted communication between the computer and each of the network devices; and transmitting a second searching packet via the network to search for network devices in the network, the second searching packet omitting a query to obtain information regarding whether an encryption function to communicate with the information processing device has been previously authorized, and receiving a reply packet if plaintext communication is authorized or if the encryption function to communicate with the information processing device has been previously authorized.

18. The non-transitory computer readable storage medium according to claim 17, wherein the network devices in which the encrypted communication with the computer has not been authorized and the network devices in which the encrypted communication with the computer has been authorized are explicitly distinguished on a network device basis in the list of devices displayed in the displaying step.

19. The non-transitory computer readable storage medium of claim 17, wherein the encryption enabled device list includes node addresses for network devices having authorized encrypted communications with the information processing device.

20. The non-transitory computer readable storage medium of claim 19, wherein the node address is an Internet Protocol (IP) address.

* * * * *